March 30, 1965 R. R. REDDY 3,175,455
ANCHORING DEVICE WITH EXPANSIBLE WEDGE ELEMENTS
Filed Aug. 2, 1961
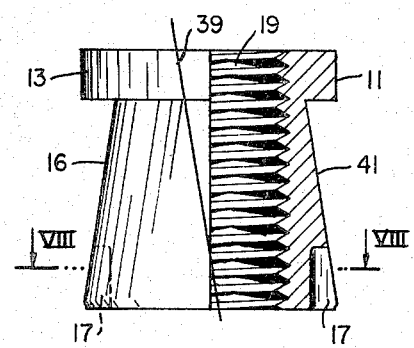
Fig-1-
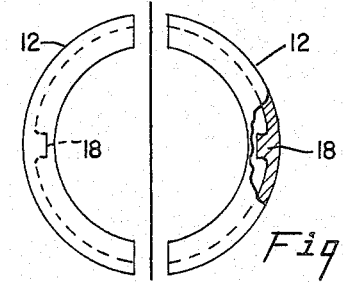
Fig-3-
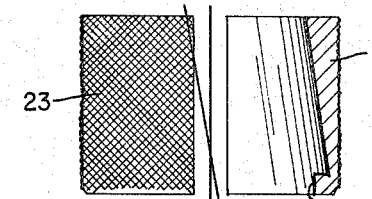
Fig-2-
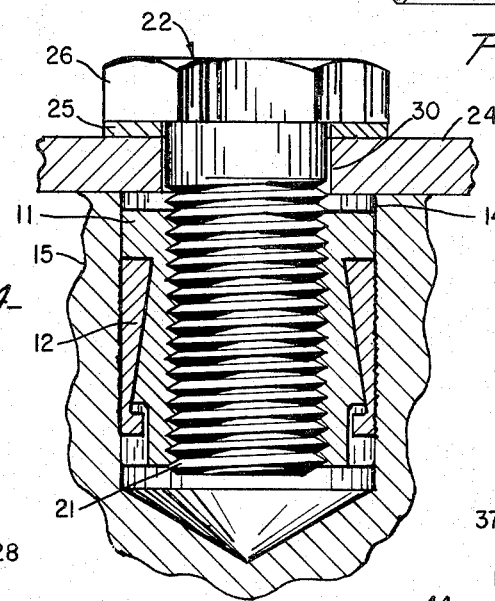
Fig-4-
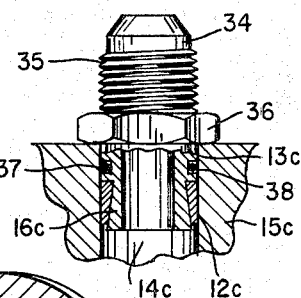
Fig-7-
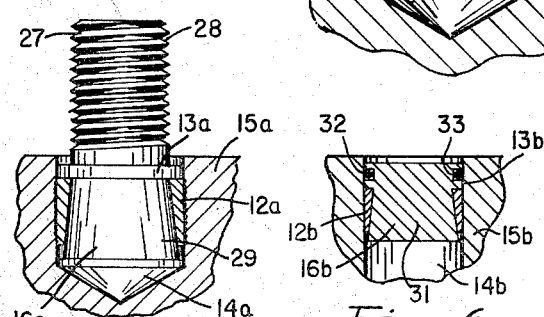
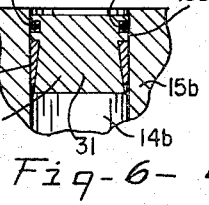
Fig-6-
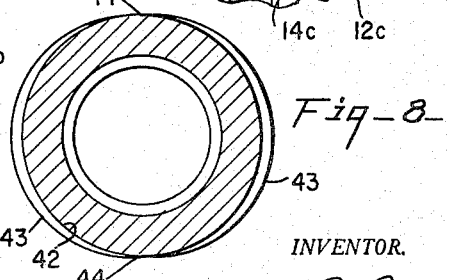
Fig-8-
INVENTOR.
Robert R. Reddy 3,175,455
ANCHORING DEVICE WITH EXPANSIBLE
WEDGE ELEMENTS
Robert R. Reddy, Pasadena, Calif., assignor to Jettron
Products, Inc., Hanover, N.J., a corporation of New
Jersey
Filed Aug. 2, 1961, Ser. No. 128,714
2 Claims. (Cl. 85—75)

This invention relates to expansion bolts and, more particularly, to an insert adapted to closely fit a cylindrical pocket in a base member and receive a connecting bolt which may pass through a plate, or other device to be secured thereto, and effect the self-locking action.

An object of my invention is to create an insert which will meet all screw torque requirements and still not turn or become dislodged.

Another object of my invention is to create an insert that can be installed in a blind hole, without the use of special tools and machining other than a drilled hole.

A further object is to use the insert as a nut in flanges, eliminating the need of spot-facing and the use of a wrench as required on nuts, during the torquing of the screw, wherein upon removing the screw from the flange, the insert remains with the flange.

A still further object of my invention is to use such an insert to secure studs in materials when so desired.

An additional object of my invention is to provide a self-locking insert comprising a plurality of wedge elements, with outer surfaces roughened but otherwise substantially cylindrical, and inner surfaces inclined with respect thereto, and a nut surrounded by said wedge elements, having a collar portion disposed axially beyond, terminating in a cylindrical surface corresponding in curvature with, the outer surfaces of said wedge elements and a body portion axially longer than said wedge elements and with an outer surface inclined to correspond with the wedge inner surface inclination and formed for the reception of a bolt.

Another object of my invention is to provide, in combination, a base member having a cylindrical pocket receiving such an insert, and a device disposed over said base member and with an aperture receiving a bolt for threadably engaging said insert, whereupon turning of said bolt performs the double function of locking the insert in the base member and tightening the device thereto.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a partial elevational and partial axial sectional view of a nut forming a part of the self-locking insert of my invention.

FIGURE 2 is an elevational view of one of the wedge elements to be associated with the nut of FIGURE 1, and an axial sectional view of another or other wedge element to be associated with said nut.

FIGURE 3 is a plan of the wedge elements of FIGURE 2, with one of said elements partly broken away to more clearly illustrate the centering lug thereof.

FIGURE 4 is an axial sectional view of the assembled nut and wedge elements after reception in a cylindrical cavity in a base member, and an associated bolt shown in elevation and holding a plate in position on said base member, said plate and base member being shown in axial section.

FIGURE 5 is a view corresponding to FIGURE 4, except that instead of showing a plate and base member connected by an embodiment of my invention, there is shown a stud held in place in a base member by a self-locking insert embodying my invention.

FIGURE 6 is an axial sectional view corresponding to FIGURE 5, except that here an aperture in the base member is shown plugged by a self-locking insert embodying my invention.

FIGURE 7 is a view corresponding to FIGURE 5, except that here a tubular fitting is shown connected in an aperture in a base member by an insert embodying my invention.

FIGURE 8 is a transverse sectional view of a nut embodying my invention, as on the line VIII—VIII of FIGURE 1, but showing a slight modification.

Difficulty has been experienced in providing an insert to effectively replace threads in soft materials which, due to frequent assembly and disassembly, causes wear of such threads as well as stripping, which results in unnecessary scrappage of otherwise usable material. Difficulty has also been found in securing an insert which, when installed, does not require special tools as well as special machining, and which will not turn or pull out under bolt torque requirements. My invention is proposed to solve these problems.

Referring to the drawings in detail, and first considering the embodiment of my invention illustrated in FIGURES 1 to 4, inclusive, there is shown a self-locking insert consisting of a nut 11 and a plurality of wedges or wedge elements 12 associated therewith. These wedge elements are identical and, although only two are desired and here shown, I am not limited to the number which may be employed.

The nut 11 comprises an outer or collar portion 13 having a diameter generally corresponding with the diameter of the pocket or aperture 14 in a base member 15, to which the insert is to be applied, with sufficient clearance, however, to allow for easy application. The portion of the nut 11 inwardly of or below the collar 13 is flared downwardly or inwardly, as indicated at 16. This flared surface is here shown frustoconical about the axis of the nut 11. The lower portion of the nut 11 is desirably notched or grooved, as indicated at 17, to receive corresponding lugs or protrusions 18 on the wedge members 12 to avoid turning therebetween. The nut 11 has interior threads 19 fitting threads 21 on an associated bolt or screw 22.

The associated wedge members 12 have outer surfaces knurled or otherwise roughened, as indicated at 23, to minimize turning or other movement with respect to the sides or surface defining the aperture or pocket 14 in the base member 15. The curvature of these surfaces corresponds generally with the curvature of the sides of the aperture 14, as well as with that of the collar 13 on the nut 11, so that the parts fit together as viewed in FIGURE 4. The axial length of the wedges 12 is somewhat less than the length of the flared or tapered portion 16 of the nut. Upon insertion of the insert, the lower portion of the nut 11 passes first into the pocket 14, the collar 13 acting as a pusher for the wedge members 12 until the insert reaches the position illustrated in FIGURE 4.

The depth of the pocket 14 need only be slightly greater than the axial length of the insert, which is determined by design requirements. That is, the depth may vary with the angle of the mating inclined surfaces on the nut and wedges. The base member 15 may be of conventional material, including steel and masonry. The parts of the insert may be formed of conventional materials, including steel and other durable metals. The protrusions or lugs 18 on the wedges 12, upon assembly of the parts, fit into the notches 17 in the nut 11 and maintain the desired relative relationship between the parts. This interfitting prevents relative turning, even upon turning of the bolt 22 which is applied after passing through a device or plate 24, which it is desired to secure to the base member 15. A washer 25 may, if desired, be used under the head 26 of the bolt 22. Said washer 25 encircles the aperture 30 in the member 24, which is desirably smaller in diameter than the diameter of the pocket 14 in the base member 15.

The action of the insert upon application is as follows. The bolt or screw 22 is turned into the nut 11 until the head 26 of the bolt comes in contact with the part to be screwed to the base member 15. The force induced by the torque on the bolt 22 moves the nut axially toward the head of the bolt. The movement of the frustoconical surface of the nut 11 along the mating frustoconical surfaces of the wedges 12 pushes them apart, exerting a radial force between the outer, preferably knurled surfaces of said wedges and the engaged surface defining the pocket 14 in the base member 15. This action locks the insert in place. As the axial force increases, the radial force increases proportionally. The greater the torque on the bolt, the tighter the insert becomes, insuring complete reliability of anchoring under the most rigorous requirements.

As an alternative, the nut 11 may be used without slots or notches 17 and the wedges 12 without lugs or protrusions 18. In such cases, friction between the frustoconical or otherwise inclined mating surfaces is relied on to prevent the inserts from being dislodged and turning. The installation is otherwise the same as previously described.

Referring now to the embodiment of my invention illustrated in FIGURE 5, there is shown a stud 27 having an outer or upper threaded portion 28 and a lower or inner portion 29. The portion 29 has a collar 13a of a diameter generally corresponding with the diameter of a pocket or aperture 14a in a base member 15a to which the stud is to be secured, with sufficient clearance, however, to allow for easy application. The portion of the stud 27 inwardly or below the collar 13a is flared downwardly or inwardly as indicated at 16a. The surface of this flared portion is here shown as frustoconical about the axis of the stud 27. The lower portion of the stud is here shown plain, but may be notched or grooved, like the nut 11 as indicated at 17 in FIGURE 1, for a similar purpose.

Associated with the flared portion 16a are wedge members 12a which have outer surfaces desirably knurled or otherwise roughened, like the surfaces at 23 in the first embodiment, to minimize turning or other movement with respect to the sides defining the aperture or pocket 14a in the base member 15a. The curvature of these sides corresponds generally with the curvature of the sides of the aperture 14a, as well as with the collar 13a, so that the parts fit together as illustrated. The axial length of the wedges 12a is somewhat less than the axial length of the flared or tapered portion 16a of the stud. Upon insertion of the assembled flared portion 16a and wedges 12a in the pocket 14a, the lower portion of said stud 27 passes first into said pocket 14a. The collar 13a acts as a pusher for the wedge members 12a until the parts reach the position illustrated.

The depth of the pocket 14a need only be slightly greater than the axial length of the stud from the top of the collar 13a to the bottom of the flared portion 16a, said length being determined by design requirements. That is, the depth may vary with the angle of the inclined surfaces on the flared portion 16a and the wedges 12a. As no interlocking portions are shown on the parts 12a and 16a, friction is relied on to maintain the desired relationship. However, such interfitting lugs and notches may be employed as in the first embodiment.

The action upon application of the stud to the pocket is as follows. After the parts have been placed in the pocket 14a as illustrated, force is applied to pull outwardly on the stud 27, as by the application of a nut (not shown) to the threaded portion 28 thereof, as in the securing of a plate or other device, such as 24 in the first embodiment, over the base member 15a. This force moves the stud 27 axially upward or outward. The movement of the frustoconical or flared surface 16a along the mating frustoconical or flared surfaces of the wedges 12a forces the latter apart, exerting a radial force between the outer preferably knurled surfaces of said wedge and the engaged surfaces defining the pocket 14a in the base member 15a. This action locks the stud in place. As the axial force increases, the radial force increases proportionally. The greater the torque applied by a nut, if used, the tighter becomes the engagement of the stud 27 in the base member 15a becomes.

Referring now to the embodiment of my invention illustrated in FIGURE 6, there is shown a self-locking plug 31 consisting of an outer or collar portion 13b having a diameter generally corresponding with the diameter of the pocket or aperture 14b in a base member 15b, to which the plug is to be applied, with sufficient clearance, however, to allow for easy application. The collar 13b is here shown provided with a peripheral groove 32 in which packing 33 is received for sealing purposes. The portion of the plug 31 inwardly of or below the collar 13b is flared downwardly or inwardly as illustrated at 16b. The flared portion is here shown as frustoconical about the axis of the plug 31. The lower portion of the plug is not here shown notched, as illustrated at 17 in FIGURE 1, to receive corresponding lugs, as indicated at 18 in FIGURE 2, friction being relied on to keep the parts in position. However, such notches and lugs may be employed if desired.

The associated wedge members 12b have outer surfaces desirably knurled or otherwise roughened, as indicated at 23 in FIGURE 2, to minimize turning or other movement with respect to the sides or surface defining the aperture or pocket 14b. The curvature of these sides corresponds generally to the curvature of 14b as well, as with that of the periphery of the collar 13b, so that the parts fit together as illustrated. The axial length of the wedges 12b is somewhat less than the length of the flared or tapered portion of the plug 31 below the collar 13b.

Upon insertion of the plug 31 and assembled wedges 12b, the lower portion of the flared part 16b passes first into the aperture 14b. The collar 13b acts as a pusher for the wedge members 12b until the plug reaches the position illustrated. The plug is tightened in the aperture 14b by pulling or forcing the tapered portion 16b upwardly. The movement of said tapered portion 16b, along the mating frustoconical surfaces of the wedges 12b, pushes them apart, exerting a radial force between the outer preferably knurled surfaces of said wedges and the engaged surface defining the pocket 14b in the base member 15b, to lock the lug firmly in place. The action is thus similar to that in the preceding embodiment.

Referring now to the embodiment of my invention illustrated in FIGURE 7, there is shown a hollow fitting 34 having its outer or upper end threaded as indicated at 35 for reception of a nut 36. Said fitting 34 is for the purpose of conveying fluid to or from an aperture 14c in a base member 15c. Its lower or inner portion is constructed to lock in said aperture 14c as in the preceding embodiments. For that purpose, the embedded or lower portion of 34 comprises an outer or collar portion 13c of a diameter generally corresponding with the diameter of the pocket or aperture 14c, with sufficient clearance as to allow for easy application.

The portion of the fitting 34 inwardly of or below the collar 13c is flared inwardly as indicated at 16c. This flared surface is here shown as frustoconical about the axis of the fitting 34. The lower part of the flared portion 16c is here shown without grooves corresponding with those designated 17 in FIGURE 1 and the associated wedge members 12c are shown without lugs or protrusions, corresponding with those designated 18 in FIGURES 2 and 3 to avoid turning between the associated parts as, in this instance, friction is relied on for that purpose. However, those interlocking parts may be used, if desired.

The associated wedge members 12c desirably have outer surfaces knurled or otherwise roughened, as indicated at 23 in FIGURE 2, to minimize turning or other movement with respect to the sides or surface defining the aperture 14c. The curvature of these surfaces corresponds generally with the curvature of the sides of the aperture 14c, as well as with that of the collar 13c, so that the parts fit together as illustrated. The collar is desirably provided with a peripheral groove 37 in which packing 38 is received to minimize leakage between the fitting and the base member 15c.

The action of the fitting upon application is as follows: Upon insertion of the assembled parts, the nut 36 is turned on the threads 35 until it comes in contact with the base member 15c or a washer thereon, if such is used. The force induced by the torque on the nut 36 moves the fitting 34 axially upward or outward. The movement of the frustoconical surface on the portion 16c along the mating frustoconical surfaces of the wedges 12c urges the latter apart, exerting a radial force between the outer preferably knurled surfaces of said wedge and the engaged surface defining the aperture 14c. This action locks the fitting in place. As the axial force increases, the radial force increases proportionally, insuring complete reliability of anchoring.

Referring now to the embodiment of my invention illustrated in FIGURE 8, there is shown a modification which may apply to any or all of the preceding embodiments. This modification involves the forming of the mating surfaces between the inner flared portion, designated 16 in the first embodiment, and the outer wedges designated 12 in said embodiment, as cylindrical about the axes of the surfaces. Thus in the present embodiment, the outer surface of the right half of a flared portion, such as 16, is cylindrical about the axis 39, which is parallel to the element 41 which is that along which the plane of the section of FIGURE 1 passes.

This means that the curve 42, as the periphery of the intersection at the plane normal to the axis of the device and along the line VIII—VIII of FIGURE 1, is not quite circular, but is approximately about the axis of the nut 11 where it intersects the diagonal line 39. In this embodiment the portions below the line VIII—VIII flare outwardly beyond the curve 42 only to the left and right, as indicated at 43, the curves 42 and 43 meeting at the top and bottom as shown at 44. The curvature of the left-hand portion of the flared part 16, as modified in accordance with FIGURE 8, would be cylindrical about a diagonal line extending parallel to the outline of said part at the left of FIGURE 1, this diagonal part making an angle with the axis at the right rather than at the left thereof.

The advantage of such a modification, as viewed in FIGURE 8, would be that upon movement between the inner flared portion and the wedges, there would always be maintained an original true and exact engagement, as the cylindrical surfaces do not vary in curvature as they extend along an axis, in contrast with frustoconical surfaces. However, this is a refinement which is not necessary when the movement between the surfaces is very small, as is contemplated in accordance with my invention. It is described as a possibility, especially when it is desired to have a relatively great movement between the surfaces on the flared inner portion and the engaged surfaces on the associated wedges disposed outwardly thereof.

Having now described my invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In combination, a base member having a generally cylindrical pocket formed therein, an associated device disposed over said base member and with an aperture smaller in diameter than that of said pocket, and means securing said device to said base member comprising a self-locking insert received in said pocket and including a plurality of wedge elements with inclined inner surfaces and outer generally cylindrical surfaces roughened to minimize slippage on and of curvature corresponding generally with the adjacent pocket surfaces, with sufficient clearance to allow for insertion and a nut consisting of a collar portion and a body portion surrounded by said wedge elements, said collar portion disposed axially beyond, terminating in a cylindrical surface corresponding in curvature with the outer surfaces of said wedge elements and so corresponding generally with the diameter of said aperture, with sufficient clearance to allow for insertion, said body portion internally threaded, with outer surfaces inclined to correspond with the inclination of said inner wedge surfaces, wherein the nut body portion surfaces, for engagement with the respective wedge elements, are cylindrical about said inclined axes about radii corresponding with those of said wedge elements inclined cylindrical surfaces so that, even upon relative axial movement, as the wedge elements are expanded by said nut, there is substantially entire surface engagement, said inclined outer surfaces of said nut being axially longer than said wedges and having grooves extending longitudinally therealong and the wedges being provided with corresponding lugs longitudinally slidable in said grooves to avoid turning therebetween, and a bolt passing through the aperture in said device and engaging the nut threads, so that tightening of said bolt causes relative axial movement between the nut and wedge elements, with radial tightening of said wedge elements against the base member.

2. In combination, a base member having a generally cylindrical aperture therein, a fitting having an unthreaded bore and an external threaded portion, a collar disposed inwardly thereof and having a peripheral groove, packing in said groove for minimizing leakage around said fitting in said aperture, and means for securing said device to said base member including a plurality of wedge elements with inner surfaces cylindrical about axes inclined to the axis of said fitting and outer generally cylindrical surfaces roughened to minimize slippage on and of curvature corresponding generally with the adjacent aperture surfaces, with sufficient clearance to allow for insertion, the body portion of said fitting in said aperture beyond said collar portion being surrounded by said wedge elements, said collar portion terminating in a cylindrical surface corresponding in radial position and curvature with the outer surfaces of said wedge elements when unexpanded and so corresponding generally with the diameter of said aperture, with sufficient clearance to allow for insertion, said body portion having outer surfaces inclined to correspond with the inclination of said inner wedge surfaces for engagement with the respective wedge elements, cylindrical about the inclined axes, and with radii corresponding with those of said wedge elements inclined cylindrical surfaces, so that even upon relative axial movement, as the wedge elements are expanded by said body portion upon outward movement of said fitting, there is substantially entire surface engagement, said inclined outer surfaces of said body portion being axially longer than said wedges and having grooves extending longitudinally therealong, and the wedges being provided with corresponding lugs longitudinally slidable in said grooves to avoid turning therebetween and a nut threaded on the fitting so that, upon turning said nut toward said base member, relative axial movement occurs between said fitting and wedge elements, with radial tightening of the latter in said aperture against the base member.

References Cited by the Examiner

UNITED STATES PATENTS

| | | | |
|---|---|---|---|
| 406,564 | 7/89 | Church | 85—2.4 |
| 681,817 | 9/01 | Smith | 85—2.4 |
| 1,033,447 | 7/12 | Mower | 85—2.4 |
| 1,035,277 | 8/12 | Veres | 85—2.4 |
| 1,101,302 | 6/14 | Masor | 85—2.4 |
| 1,115,205 | 10/14 | Johnson | 85—2.4 |
| 1,137,443 | 4/15 | Ackerman | 85—50 |
| 1,164,322 | 12/15 | Yeatman | 85—2.4 |
| 1,181,856 | 5/16 | Downer | 285—214 |
| 2,377,077 | 5/45 | Gay et al. | 85—2.4 |
| 2,574,625 | 11/51 | Coss | 285—347 |
| 2,642,768 | 6/53 | Ogburn | 85—2.4 |
| 2,879,686 | 3/59 | Lewis et al. | 85—2.4 |
| 2,937,666 | 5/60 | Maisch | 220—24.5 |

FOREIGN PATENTS

| | | |
|---|---|---|
| 14.860 | 8/28 | Australia. |
| 533,966 | 2/41 | Great Britain. |
| 1,250,852 | 12/60 | France. |

EDWARD C. ALLEN, *Primary Examiner.*

CARL W. TOMLIN, *Examiner.*